United States Patent
Kobayashi et al.

(10) Patent No.: US 10,150,394 B2
(45) Date of Patent: Dec. 11, 2018

(54) HEADREST AND SEAT INCLUDING THE SAME

(71) Applicants: TOKAI CHEMICAL INDUSTRIES, LTD., Gifu-ken (JP); TOYOTA BOSHOKU KABUSHIKI KAISHA, Aichi-ken (JP)

(72) Inventors: Seiji Kobayashi, Gifu-ken (JP); Hiroyuki Nasu, Aichi-ken (JP)

(73) Assignees: TOKAI CHEMICAL INDUSTRIES, LTD., Gifu-Ken (JP); TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/184,303

(22) Filed: Jun. 16, 2016

(65) Prior Publication Data
US 2016/0368403 A1 Dec. 22, 2016

(30) Foreign Application Priority Data
Jun. 19, 2015 (JP) .................. 2015-124212

(51) Int. Cl.
*B60N 2/888* (2018.01)
*B60N 2/80* (2018.01)

(52) U.S. Cl.
CPC .......... *B60N 2/80* (2018.02); *B60N 2002/899* (2018.02)

(58) Field of Classification Search
CPC . B60N 2/48; B60N 2/4885; B60N 2002/4888
See application file for complete search history.

(56) References Cited

U.S. PATENT DOCUMENTS 7,422,290 B2 * 9/2008 Matsushima .......... A47C 7/022
297/452.28
9,387,784 B2 * 7/2016 Haga .................... B60N 2/4805
(Continued)

FOREIGN PATENT DOCUMENTS

JP 2012-86715 5/2012
JP 2014-15076 1/2014
(Continued)

OTHER PUBLICATIONS

Office Action issued in CHINA Counterpart Patent Appl. No. 201610438555.3, dated Jan. 25, 2018, along with an English translation thereof.
(Continued)

*Primary Examiner* — Philip F Gabler
(74) *Attorney, Agent, or Firm* — Greenblum & Bernstein, P.L.C.

(57) ABSTRACT

A headrest includes a stay, a headrest body, and a dynamic damper attached to the stay. The dynamic damper includes: an attachment member having an attachment portion attached to the stay and an opening having no bottom; an elastic member fixed along its entire perimeter by an edge of the opening and placed in the opening; and a weight embedded in the elastic member and placed in the opening. The attachment member includes a front-side divided body and a back-side divided body. The elastic member is sandwiched between the front-side divided body and the back-side divided body, whereby the elastic member is fixed along its entire perimeter by the edge.

12 Claims, 16 Drawing Sheets

(56) References Cited

U.S. PATENT DOCUMENTS

| | | | |
|---|---|---|---|
| 9,511,695 B2* | 12/2016 | Okubo | B60N 2/4808 |
| 2012/0098316 A1* | 4/2012 | Matsushima | B60N 2/4817 |
| | | | 297/391 |
| 2015/0183343 A1* | 7/2015 | Okubo | B60N 2/48 |
| | | | 297/404 |
| 2015/0251576 A1* | 9/2015 | Ishimoto | F16F 7/108 |
| | | | 297/391 |
| 2016/0121770 A1* | 5/2016 | Takahashi | B60N 2/68 |
| | | | 297/452.18 |
| 2016/0339815 A1* | 11/2016 | Mizobata | B60N 2/48 |

FOREIGN PATENT DOCUMENTS

| | | | |
|---|---|---|---|
| JP | 2014-234104 | 12/2014 | |
| JP | 2014234104 A * | 12/2014 | B60N 2/48 |

OTHER PUBLICATIONS

Office Action issued in China Counterpart Patent Appl. No. 201610438555.3, dated Aug. 8, 2018, along with an English translation thereof.

* cited by examiner

HEADREST AND SEAT INCLUDING THE SAME

INCORPORATION BY REFERENCE

The disclosure of Japanese Patent Application No. 2015-124212 filed on Jun. 19, 2015 including the specification, drawings and abstract is incorporated herein by reference in its entirety.

BACKGROUND OF THE INVENTION

1. Field of the Invention

The present invention relates to headrests including a dynamic damper and seats including the headrest.

2. Description of Related Art

Vibrations from a road, an engine, etc. tend to be transmitted to seats for vehicles. In order to restrain vibrations, a headrest described in Japanese Patent Application Publication No. 2014-234104 (JP 2014-234104 A) includes a dynamic damper for damping vibrations.

The dynamic damper includes a resin insert, a urethane mat, and a weight. The urethane mat forms a spring system of the dynamic damper, and the weight forms a mass system of the dynamic damper. The weight is embedded in the urethane mat. The resin insert has a bottomed recess opening toward the rear of a vehicle. The weight is placed in this recess.

SUMMARY OF THE INVENTION

In the headrest of JP 2014-234104 A, the bottom of the recess is located on the front side as viewed from the weight. The weight is therefore less likely to be displaced toward the front. That is, displacement of the weight in the front-rear direction tends to be restricted. It is an object of the present invention to provide a headrest including a dynamic damper that is less likely to restrict displacement of a weight, a seat, and a manufacturing method of the headrest.

(1) In order to achieve the above object, a headrest according to the present invention is a headrest for a vehicle, including a stay, a headrest body supported by the stay, and a dynamic damper attached to the stay and embedded in the headrest body. The dynamic damper includes: an attachment member having an attachment portion attached to the stay and an opening extending through the attachment member in a front-back direction; an elastic member fixed along its entire perimeter by an edge of the opening and placed in the opening; and a weight embedded in the elastic member and placed in the opening, the attachment member includes a front-side divided body and a back-side divided body placed on a back side of the front-side divided body, and the elastic member is sandwiched between the front-side divided body and the back-side divided body from both sides in the front-back direction, so that the elastic member is fixed along its entire perimeter by the edge. As used herein, the "front-back direction" refers to the front-back direction of the attachment member, namely the direction in which the front-side divided body and the back-side divided body are placed next to each other. The weight forms a mass system of the dynamic damper, and the elastic member forms a spring system of the dynamic damper.

According to the headrest of the present invention, the elastic member can be fixed by the edge of the opening by sandwiching the elastic member between the front-side divided body and the back-side divided body from both sides in the front-back direction. This makes it easy to produce the dynamic damper and to position the weight with respect to the elastic member. The elastic member is fixed along its entire perimeter by the edge of the opening. This can restrict excessive displacement of the weight at the time of damping vibrations of a seat.

The opening extends through the attachment member in the front-back direction. That is, the opening is not closed by the attachment member on either side in the front-back direction. Displacement of the weight in the front-back direction at the time of damping vibrations of the seat is therefore less likely to be restricted as compared to the case where the opening is closed by the attachment member. The edge of the opening fixes the elastic member in directions crossing the front-back direction. The weight therefore tends to be preferentially displaced in the front-back direction with respect to the edge of the opening.

(2) In the configuration of (1), the front-back direction may be a front-rear direction or a left-right direction of the vehicle. In the case where the front-back direction of the attachment member coincides with the front-rear direction of the vehicle, vibrations of the seat in the front-rear direction can be preferentially restricted at the time of damping vibrations of the seat. In the case where the front-back direction of the attachment member coincides with the left-right direction of the vehicle, vibrations of the seat in the left-right direction can be preferentially restricted at the time of damping vibrations of the seat.

(3) In the configuration of (1) or (2), the elastic member may include a front-side elastic body and a back-side elastic body placed on a back side of the front-side elastic body, the weight may be sandwiched between the front-side elastic body and the back-side elastic body from both sides in the front-back direction, so that the weight is placed along a boundary plane between the front-side elastic body and the back-side elastic body, and a clearance may be defined between the weight and the front-side and back-side elastic bodies along the boundary plane.

According to this configuration, the clearance can be provided so as to adjoin the weight. The weight therefore tends to be preferentially displaced in the direction toward the clearance. For example, in the case where this configuration is combined with the configuration of (2) and the front-back direction of the attachment member coincides with the front-rear direction of the vehicle, the clearance can be provided on both sides in the left-right direction of the weight. The weight therefore tends to be displaced in the left-right direction in addition to the front-rear direction.

For example, in the case where this configuration is combined with the configuration of (2) and the front-back direction of the attachment member coincides with the left-right direction of the vehicle, the clearance can be provided on both sides in the front-rear direction of the weight. The weight therefore tends to be displaced in the front-rear direction in addition to the left-right direction.

(4) In the configuration of (3), the elastic member having the weight embedded therein and the stay may be sandwiched between the front-side divided body and the back-side divided body from both sides in the front-back direction, so that the elastic member is fixed along its entire perimeter by the edge of the opening and the attachment portion is attached to the stay.

According to this configuration, fixing of the elastic member and attachment of the attachment portion can be performed in parallel. This makes it easy to produce the dynamic damper and to attach the dynamic damper to the stay.

(5) In the configuration of (4), the stay may include a pair of legs extending in an up-down direction and a connecting portion connecting upper ends of the pair of legs, the attachment member may be interposed between the pair of legs, and a pair of slit portions opening downward may be defined between the attachment member and the pair of legs. According to this configuration, the length of the pair of legs can be increased by an amount corresponding to the pair of slit portions.

(5-1) A manufacturing method of the headrest having the configuration of (5) will be described. The headrest body of the headrest includes bag-shaped upholstery having a pair of leg holes and an assembly hole. The attachment member has a slit-corresponding portion that is located between the pair of slit portions and a non-slit-corresponding portion that is not located between the pair of slit portions.

The manufacturing method of the headrest includes: a joining step of sandwiching the elastic member having the weight embedded therein and the stay between the front-side divided body and the back-side divided body from both sides in the front-back direction, and thus fixing the elastic member along its entire perimeter by the edge of the opening and attaching the attachment portion to the stay, thereby producing a damper assembly formed by joining the dynamic damper and the stay; a first insertion step of inserting the pair of legs into the upholstery through the assembly hole in a first insertion direction such that the attachment member remains outside the upholstery, and causing the pair of legs to stick out of the upholstery from the pair of leg holes; and a second insertion step of covering the non-slit-corresponding portion with a part of the upholstery, which is located near an edge of the assembly hole, and inserting the slit-corresponding portion into the upholstery through the assembly hole in a second insertion direction, the first insertion direction being a direction from an upper side toward a lower side, and the second insertion direction being a direction opposite to the first insertion direction.

As used herein, the "first insertion direction" refers to the direction from the upper side toward the lower side in the state where a seatback is standing. Before the headrest is mounted on the seatback, the "first insertion direction" may correspond to other directions (e.g., the direction from the front toward the rear or the opposite direction thereto).

According to this manufacturing method of the headrest, fixing of the elastic member and attachment of the attachment portion can be performed in parallel in the joining step. That is, production of the dynamic damper and attachment of the dynamic damper to the stay can be performed in parallel.

In the first insertion step, the pair of legs are inserted into the upholstery via the assembly hole and then caused to stick out from the pair of leg holes. When the first insertion step is finished, portions (a pair of inter-hole portions) between the assembly hole and the pair of leg holes in the upholstery are located in the upper ends of the slit portions. The size of the non-slit-corresponding portion can therefore be reduced. Accordingly, the part of the upholstery, which is located near the edge of the assembly hole, can be easily lifted to cover the non-slit-corresponding portion with the upholstery in the second insertion step.

(6) In the configuration of any one of (1) to (5), the headrest may further include: a restricting portion that restricts displacement of the weight in the front-back direction. This configuration can restrict excessive displacement of the weight at the time of damping vibrations of the seat.

(7) In the configuration of (6), the restricting portion may be a pair of connecting members that are placed on the attachment member on both sides of the opening in the front-back direction so as to extend across the opening. According to this configuration, the length by which displacement of the weight is restricted can be easily controlled by adjusting the length of the connecting members.

(8) In the configuration of (6), the restricting portion may be a pair of film members that cover the elastic member from both sides in the front-back direction. According to this configuration, the length by which displacement of the weight is restricted can be easily controlled by adjusting the allowance for slacking of the film members.

(9) In the configuration of (6), the headrest body may include a cushion member made of resin foam, and the restricting portion may be a pair of impregnated layers formed by impregnating front and back surfaces of the elastic member with a raw material of the cushion member. According to this configuration, the pair of impregnated layers, namely the restricting portion, can be placed at the same time the cushion member is formed by foaming of the raw material.

(10) In order to achieve the above object, a seat according to the present invention includes the headrest according to any one of (1) to (9). The seat of the present invention makes it easy to produce the dynamic damper and to position the weight with respect to the elastic member, as described in (1). The seat of the present invention can also restrict excessive displacement of the weight at the time of damping vibrations of the seat.

The opening of the attachment member is not closed by the attachment member on either side in the front-back direction. Displacement of the weight at the time of damping vibrations of the seat is therefore less likely to be restricted. The edge of the opening fixes the elastic member in directions crossing the front-back direction. The weight therefore tends to be preferentially displaced in the front-back direction with respect to the edge of the opening.

The present invention provides a headrest including a dynamic damper that is less likely to restrict displacement of a weight, and a seat including the headrest.

DETAILED DESCRIPTION OF THE EMBODIMENTS

Embodiments of a headrest, a seat, and a method for manufacturing a headrest according to the present invention will be described below.

First Embodiment

Configuration of Seat

First, the configuration of a seat of the present embodiment will be described. In the figures mentioned below, the front-rear direction corresponds to the "front-back direction" of the present invention, the front side corresponds to the "front side" of the present invention, and the rear side corresponds to the "back side" of the present invention. The left-right direction is defined as viewed from the rear side of a vehicle.

Figure 1:
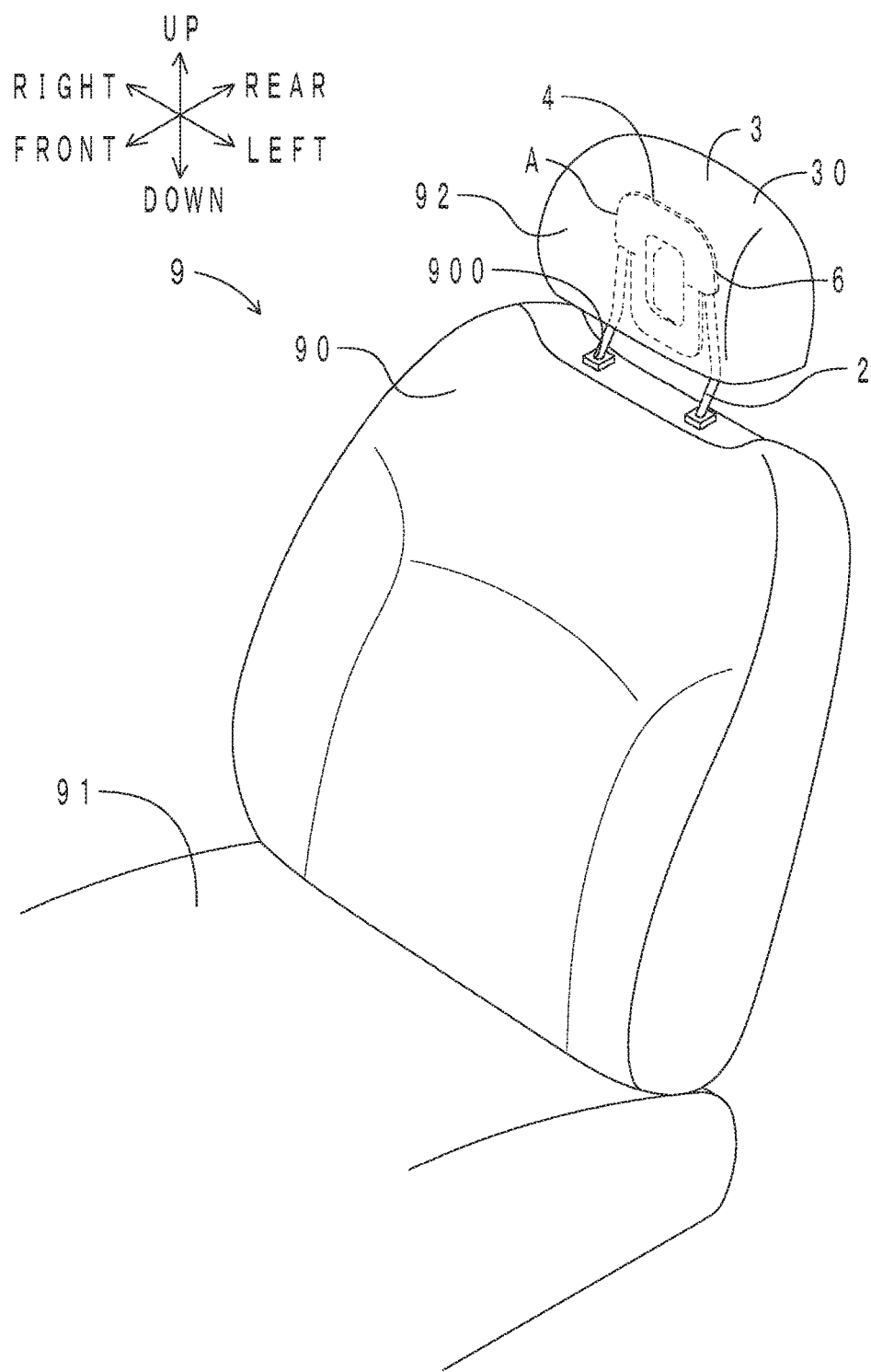
FIG. 1 is a perspective view of a seat according to a first embodiment.
Figure 2:
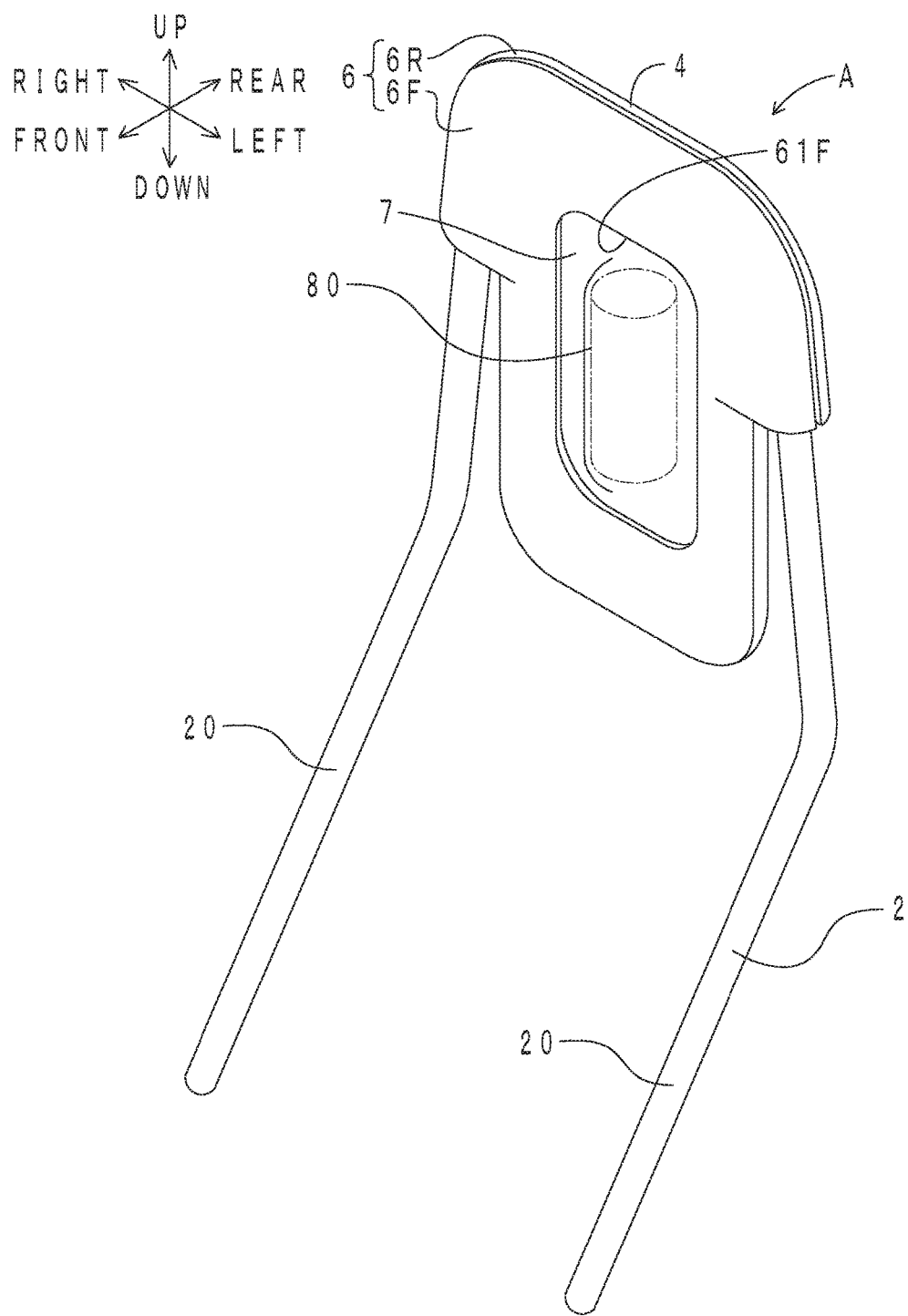
FIG. 2 is a perspective view of a damper assembly of a headrest according to the embodiment.
Figure 3:
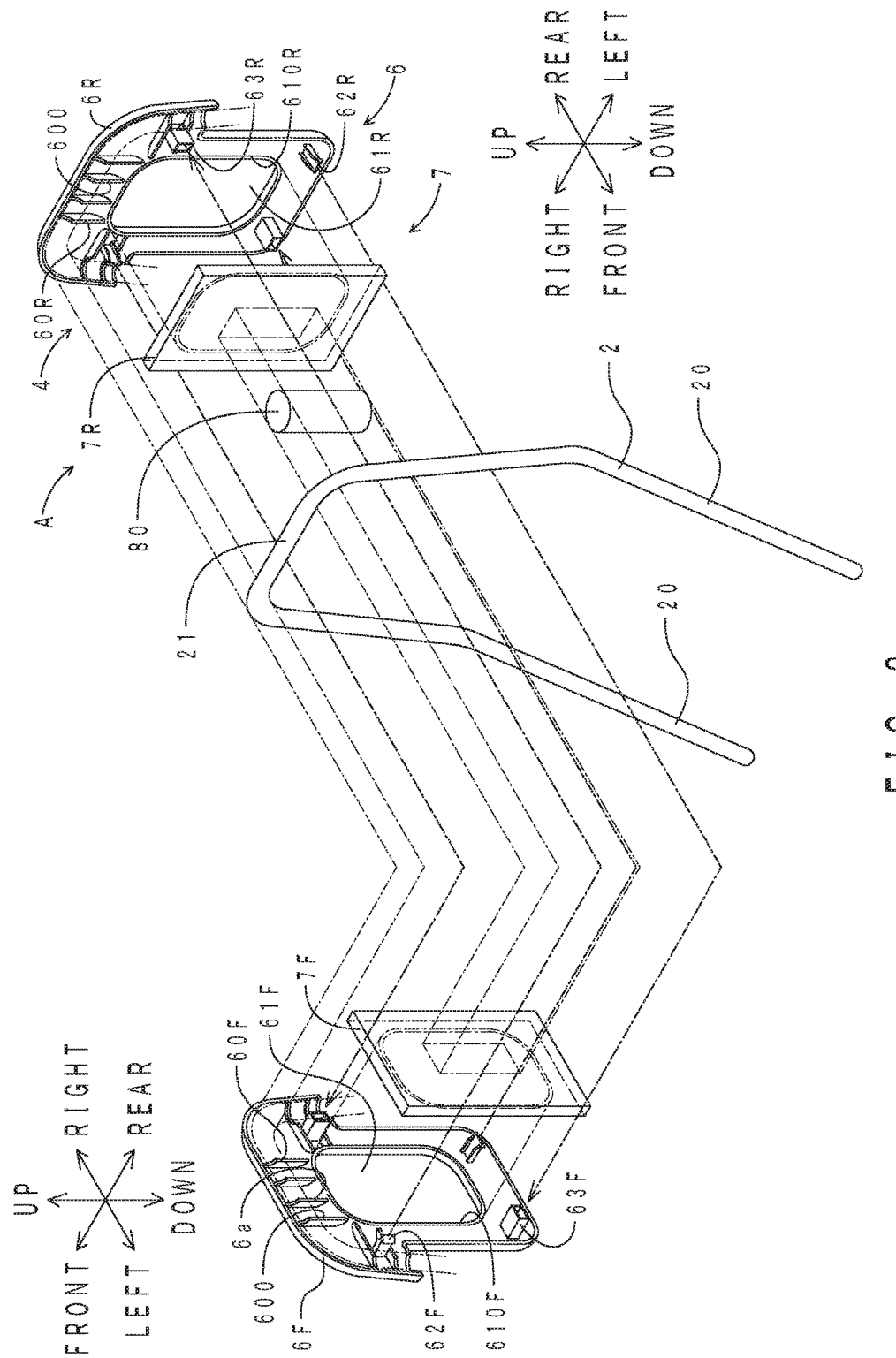
FIG. 3 is an exploded perspective view of the damper assembly.
Figure 4:
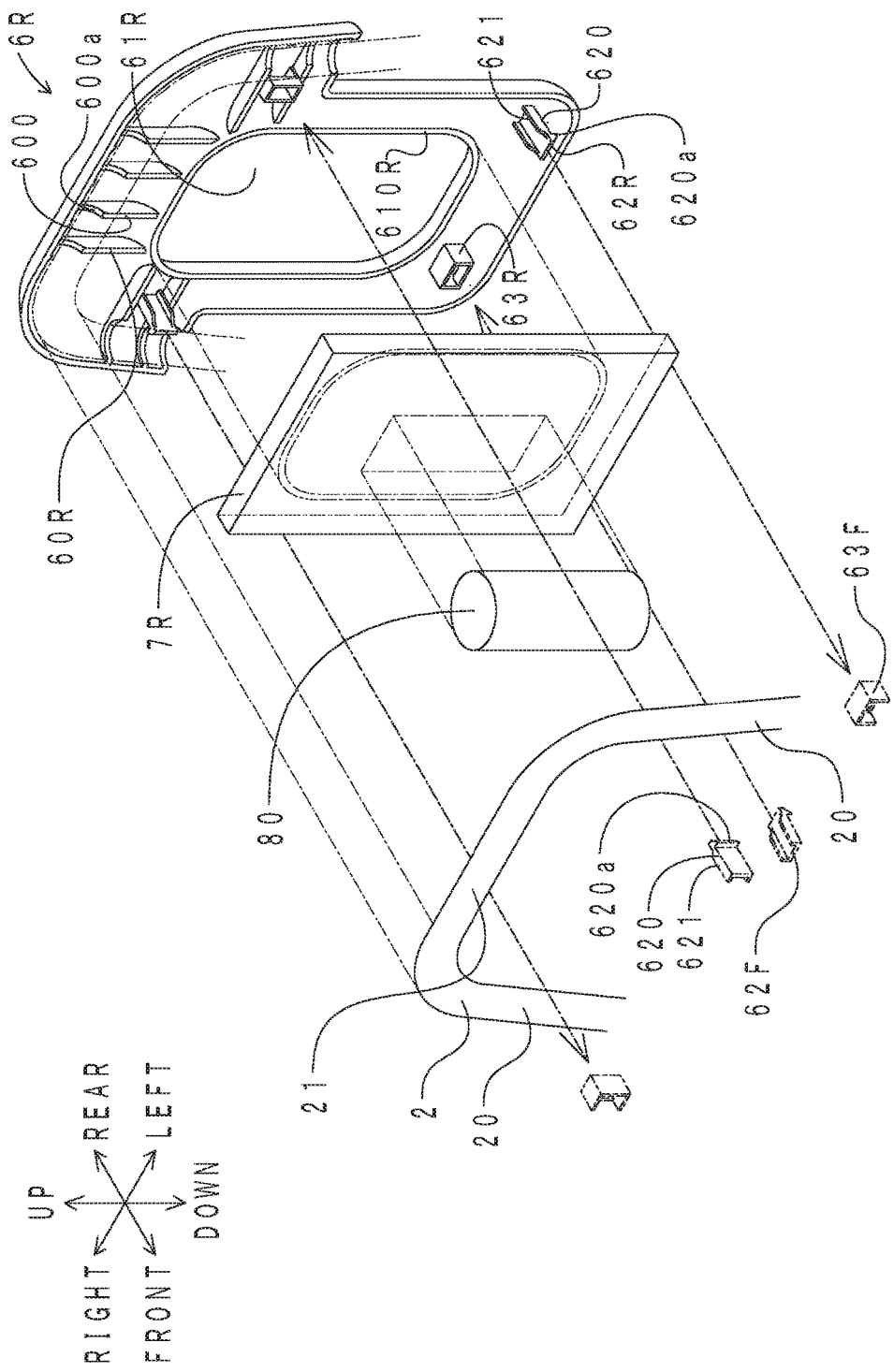
FIG. 4 is an enlarged view of a stay, a weight, a back-side elastic body, and a back-side divided body in FIG. 3.
Figure 5:
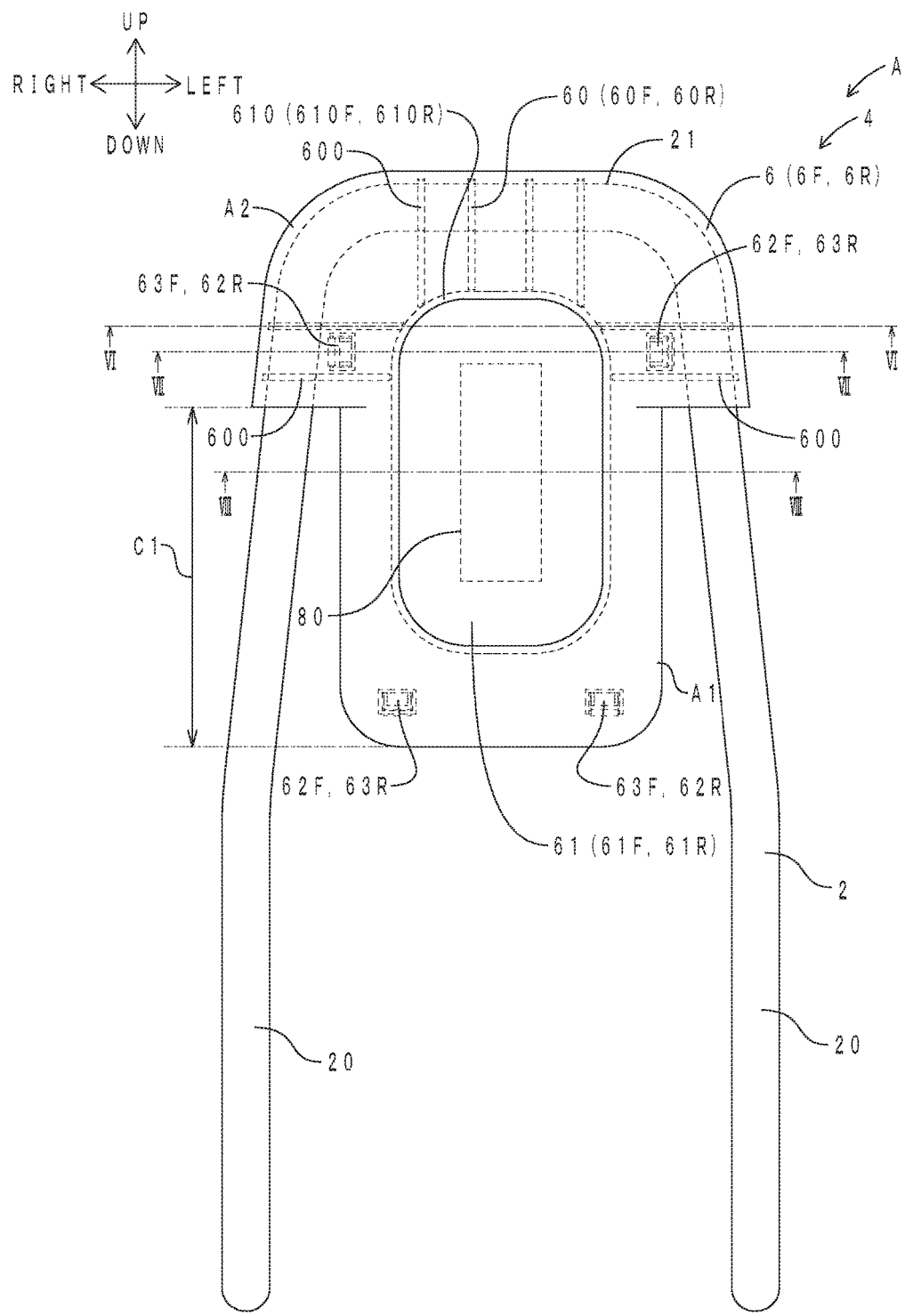
FIG. 5 is a front view of the damper assembly.
Figure 6:
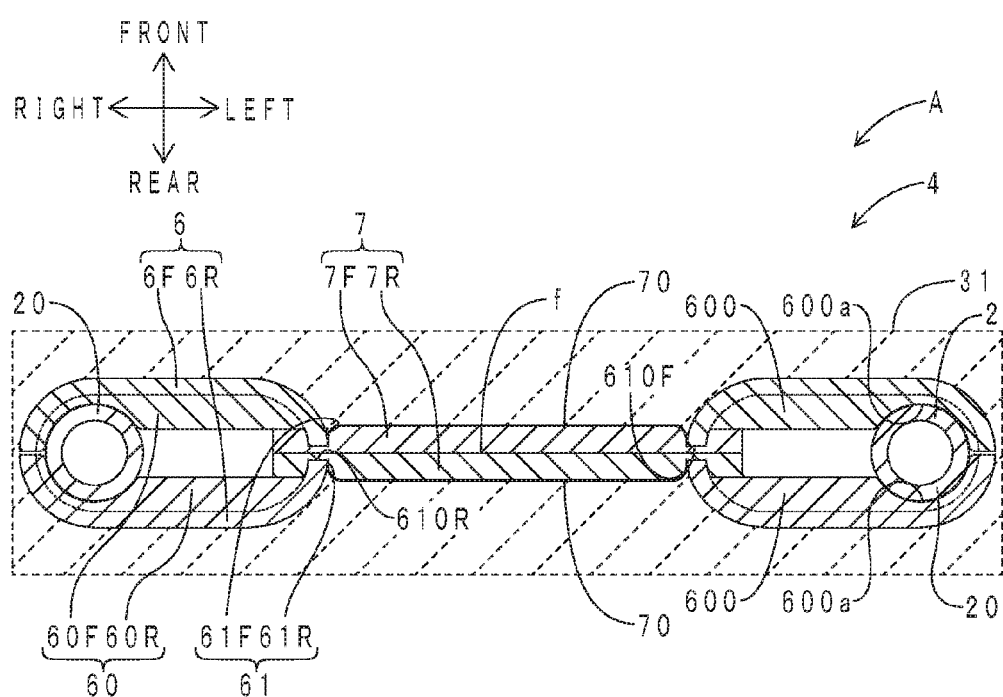
FIG. 6 is a sectional view taken along a line VI-VI in FIG. 5.
Figure 7:
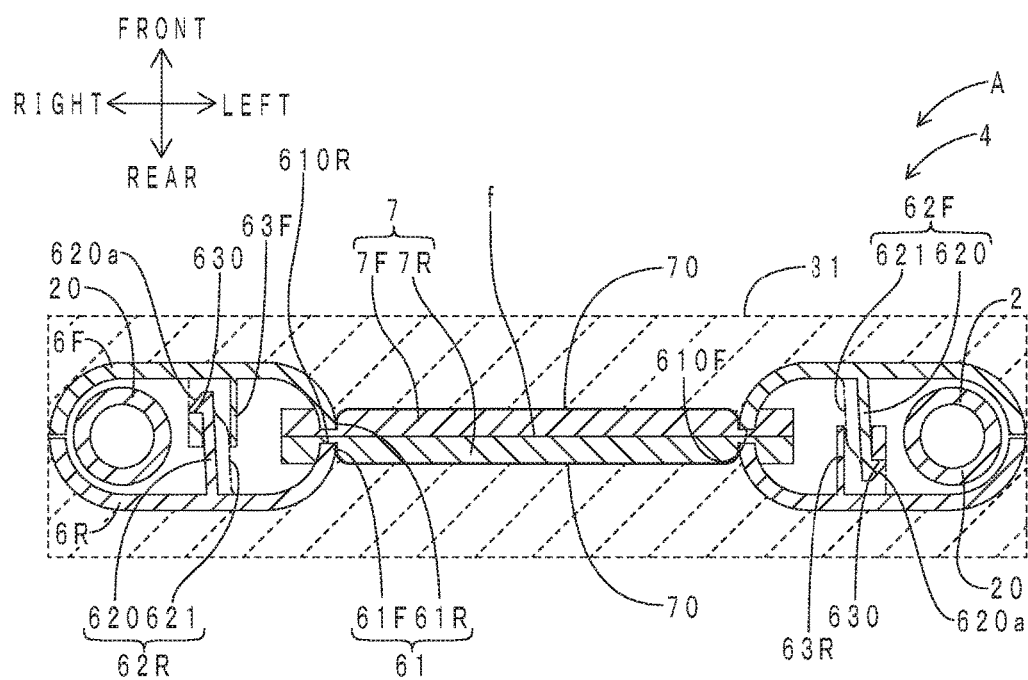
FIG. 7 is a sectional view taken along a line VII-VII in FIG. 5.
Figure 8:
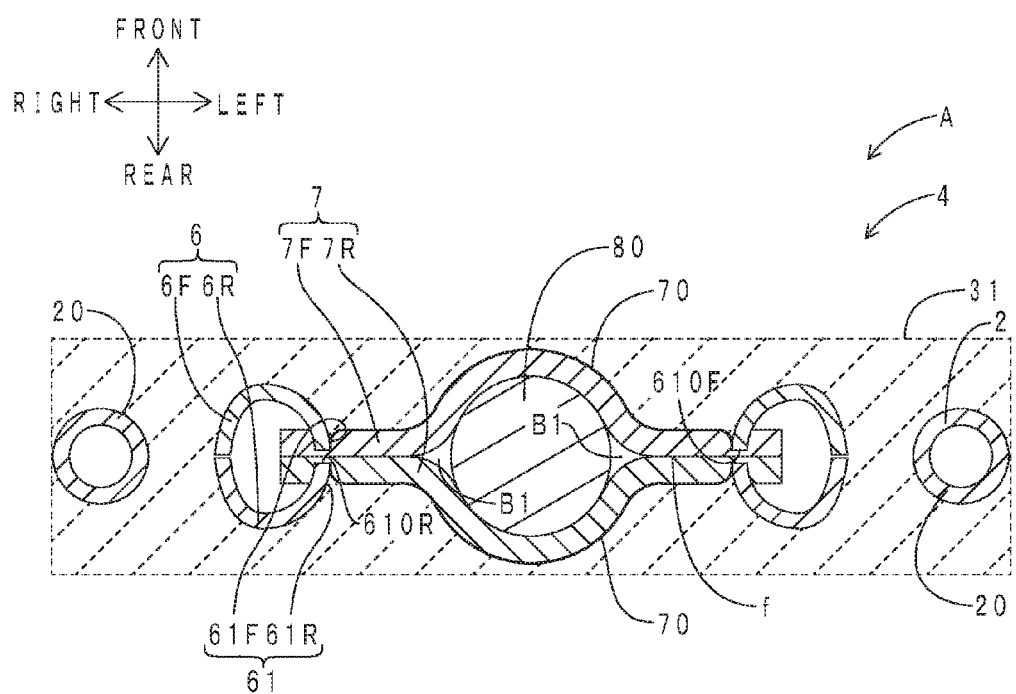
FIG. 8 is a sectional view taken along a line VIII-VIII in FIG. 5.

FIG. 1 is a perspective view of the seat of the present embodiment. FIG. 2 is a perspective view of a damper assembly of a headrest of the present embodiment. FIG. 3 is an exploded perspective view of the damper assembly. FIG. 4 is an enlarged view of a stay, a weight, a back-side elastic body, and a back-side divided body shown in FIG. 3. FIG. 5 is a front view of the damper assembly. FIG. 6 is a sectional view taken along line VI-VI in FIG. 5. FIG. 7 is a sectional view taken along line VII-VII in FIG. 5. FIG. 8 is a sectional view taken along line VIII-VIII in FIG. 5. In FIG. 1, a damper assembly A is shown in phantom. In FIG. 2, a weight 80 is shown in phantom. In FIGS. 6 to 8, a cushion member 31 of a headrest body 3 is shown by dashed hatching.

As shown in FIG. 1, a seat 9 includes a seatback 90, a seat cushion 91, and a headrest 92. The seat cushion 91 is attached to a floor (not shown) of a vehicle via a frame (not shown). The lower end of the seatback 90 is attached to the rear end of the seat cushion 91. The headrest 92 is attached to the upper end of the seatback 90. When the vehicle is traveling, vibrations are transmitted from the floor of the vehicle to the seatback 90 and the headrest 92 via the seat cushion 91.

Configuration of Headrest

The configuration of the headrest of the present embodiment will be described. As shown in FIGS. 1 to 3, the headrest 92 includes a damper assembly A and a headrest body 3. The headrest body 3 includes upholstery 30 and a cushion member (not shown). The upholstery 30 is made of resin and has the shape of a bag. The cushion member is made of elastic urethane foam (molded urethane). The cushion member is located inside the upholstery 30.

The damper assembly A includes a stay 2 and a dynamic damper 4. In the state shown in FIG. 1 (in the state where the seatback 90 stands (e.g., in the state where the seatback 90 stands so that the headrest 92 is upright), the stay 2 generally has a C-shape opening downward. The stay 2 is made of a metal tube. As shown in FIG. 3, the stay 2 includes a pair of right and left legs 20 and a connecting portion 21. The legs 20 extend in the up-down direction. The lower ends of the legs 20 are fitted in stay attachment holes 900 of the seatback 90. The connecting portion 21 extends in the left-right direction and connects the pair of right and left legs 20.

The dynamic damper 4 includes an attachment member 6, an elastic member 7, and a weight 80. As shown in FIG. 3, the elastic member 7 includes a front-side elastic body 7F and a back-side elastic body 7R. As shown in FIG. 4, the back-side elastic body 7R is made of elastic urethane foam (slab urethane) and has the shape of a rectangular plate. As shown in FIGS. 6 to 8, a back-side edge 610R of a back-side opening 61R of a back-side divided body 6R described below is in pressure-contact with the rear surface (back surface) of the back-side elastic body 7R. As shown by a thick line in FIGS. 6 to 8, an impregnated layer 70 is formed at the rear surface of the back-side elastic body 7R.

The front-side elastic body 7F is placed on the front side of the back-side elastic body 7R. The front-side elastic body 7F has the same configuration as that of the back-side elastic body 7R. As shown in FIGS. 6 to 8, a front-side edge 610F of a front-side opening 61F of a front-side divided body 6F described below is in pressure-contact with the front surface of the front-side elastic body 7F. As shown by a thick line in FIGS. 6 to 8, an impregnated layer 70 is formed at the front surface of the front-side elastic body 7F.

The weight 80 is made of metal and has a columnar shape extending in the up-down direction. As shown in FIG. 3, the weight 80 is interposed between the rear surface of the front-side elastic body 7F and the front surface of the back-side elastic body 7R. That is, the weight 80 is embedded in the elastic member 7. As shown in FIG. 8, a clearance is defined around the weight 80 along a boundary plane r between the rear surface of the front-side elastic body 7F and the front surface of the back-side elastic body 7R. Specifically, a pair of right and left clearances B1 are defined on both sides of the weight 80 in the left-right direction (the direction perpendicular to the "front-back direction" of the present invention and corresponding to the direction of the diameter of the weight 80).

The attachment member 6 includes the front-side divided body 6F and the back-side divided body 6R. As shown in FIG. 5, the attachment member 6 includes an attachment portion 60 and an opening 61. As shown in FIGS. 4 and 6 to 8, the back-side divided body 6R is made of resin and has the shape of a rectangle frame. The back-side divided body 6R has the shape of a shallow tray opening toward the front. The back-side divided body 6R is placed on the rear side of the elastic member 7. The back-side divided body 6R includes a back-side attachment portion 60R, the back-side opening 61R, a pair of back-side engaging portions 62R, and a pair of back-side engaged portions 63R.

The back-side attachment portion 60R is placed on the front surface (inner surface) of the back-side divided body 6R. As shown in FIG. 5, the back-side attachment portion 60R includes a plurality of attachment pieces 600. Each attachment piece 600 has the shape of a plate. The plurality of attachment pieces 600 are placed corresponding to the upper ends of the pair of legs 20 and the connecting portion 21 of the stay 2. As shown in FIG. 6, each attachment piece 600 has an attachment recess 600a. The bottom surface of the attachment recess 600a has the shape of an arc surface conforming to the outer peripheral surface of the upper ends of the pair of legs 20 and the connecting portion 21.

The back-side opening 61R has a rectangular shape. As shown in FIG. 4, the back-side opening 61R extends through the back-side divided body 6R in the front-rear direction. The back-side edge 610R of the back-side opening 61R projects toward the front. The back-side edge 610R has the shape of an endless annular rectangular frame.

The pair of back-side engaged portions 63R are placed on the front surface of the back-side divided body 6R. As shown in FIG. 5, one of the pair of back-side engaged portions 63R is placed near the lower right corner of the back-side opening 61R. The other back-side engaged portion 63R is placed near the upper left corner of the back-side opening 61R. That is, the pair of back-side engaged portions 63R are located at diagonal positions of the rectangular back-side opening 61R. As shown in FIG. 4, each back-side engaged portion 63R has the shape of a tube. As shown in FIG. 7, the back-side engaged portion 63R has an engaged opening 630 in its outer wall (the back-side engaged portion 63R located near the lower right corner of the back-side opening 61R has the engaged opening 630 in its lower wall, and the back-side engaged portion 63R located near the upper left corner of the back-side opening 61R has the engaged opening 630 in its left wall).

The pair of back-side engaging portions 62R are placed on the front surface of the back-side divided body 6R. As shown in FIG. 5, one of the pair of back-side engaging portions 62R is placed near the upper right corner of the back-side opening 61R. The other back-side engaging portion 62R is placed near the lower left corner of the back-side opening 61R. That is, the pair of back-side engaging portions 62R are located at diagonal positions of the rectangular back-side opening 61R. As shown in FIG. 7, each back-side engaging portion 62R has a pawl 620 and a pair of guided portions 621. The pawl 620 extends toward the front and has a barb 620a at its front end (tip end). The barb 620a projects outward (the barb 620a of the pawl 620 of the back-side engaging portion 62R located near the upper right corner of the back-side opening 61R projects to the right, and the barb 620a of the pawl 620 of the back-side engaged portion 62R located near the lower left corner of the back-side opening 61R projects downward). The pair of guided portions 621 are located on the inner side of the pawl 620. Each guided portion 621 has the shape of a triangular plate projecting from the rear (the base end of the pawl 620) toward the front (the tip end of the pawl 620).

As shown in FIG. 3, the configuration of the front-side divided body 6F is the same as that of the back-side divided body 6R. The front-side divided body or is placed in such a manner that it is reversed by 180 degrees in the horizontal direction about its vertical axis.

As shown in FIG. 5, the attachment portion 60 is formed by a front-side attachment portion 60F of the front-side divided body 6F and a back-side attachment portion 60R of the back-side divided body 6R. The attachment portion 60 is placed corresponding to the upper ends of the pair of right and left legs 20 and the connecting portion 21 of the stay 2.

As shown in FIG. 5, the attachment member 6 has a slit-corresponding portion A1 and a non-slit-corresponding portion A2. The slit-corresponding portion A1 is located on the lower side of the non-slit-corresponding portion A2. A pair of right and left slit portions C1 are formed between the slit-corresponding portion A1 and the pair of right and left legs 20. The slit portions C1 extend in the up-down direction and open downward.

As shown in FIG. 5, the opening 61 is formed by the front-side opening 61F of the front-side divided body 6F and the back-side opening 61R of the back-side divided body 6R. The opening 61 extends through the attachment member 6 in the front-rear direction. An edge 610 of the opening 61 is formed by the front-side edge 610F and the back-side edge 610R.

Manufacturing Method of Headrest

Figure 9A:
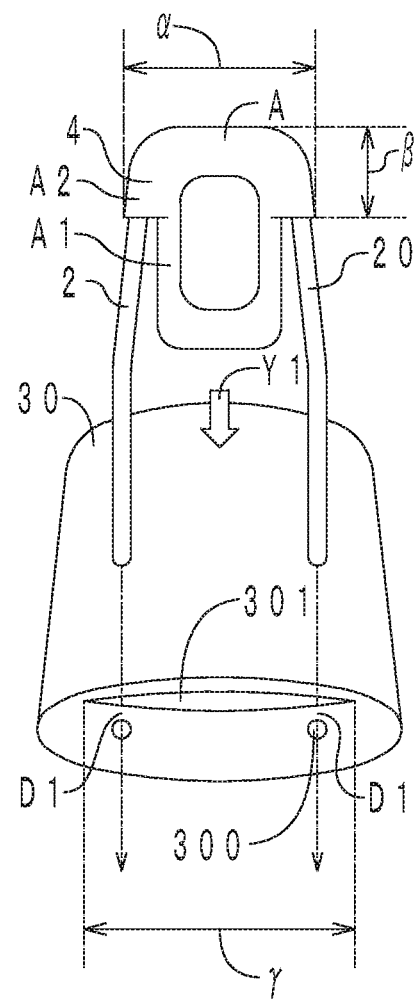
FIG. 9A is a schematic view illustrating a first insertion step of a manufacturing method of the headrest.
Figure 9B:
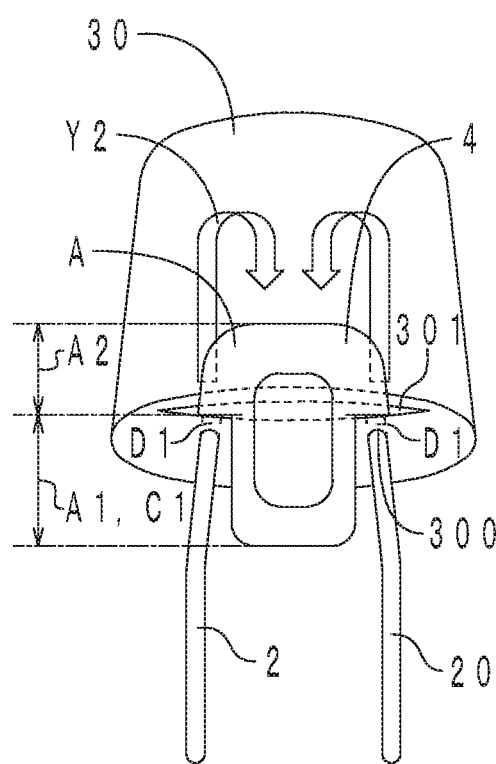
FIG. 9B is a schematic view (first view) illustrating a second insertion step of the manufacturing method.
Figure 9C:
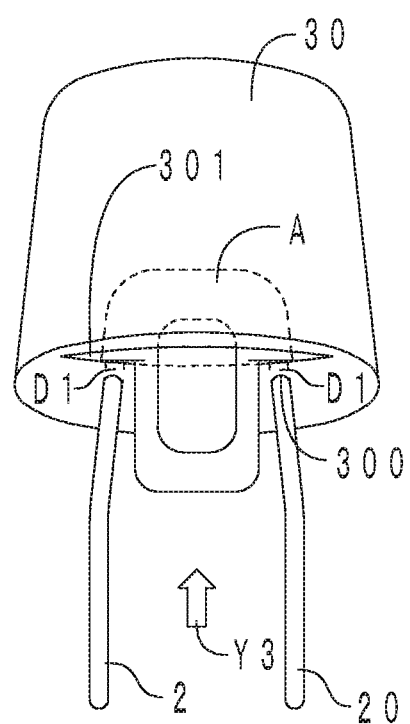
FIG. 9C is a schematic view (second view) illustrating the second insertion step of the manufacturing method.
Figure 9D:
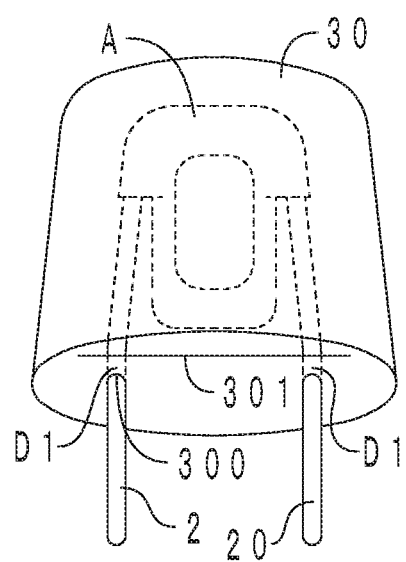
FIG. 9D is a schematic view (third view) illustrating the second insertion step of the manufacturing method.

A manufacturing method of the headrest according to the present embodiment will be described. FIG. 9A is a schematic view of a first insertion step of the manufacturing method. FIG. 9B is a schematic view (first view) of a second insertion step of the manufacturing method. FIG. 9C is a schematic view (second view) of the second insertion step of the manufacturing method. FIG. 9D is a schematic view (third view) of the second insertion step of the manufacturing method. A part of the damper assembly A, which is accommodated in the upholstery 30, is shown by dashed lines. The manufacturing method of the headrest according to the present embodiment has a joining step, the first insertion step, the second insertion step, and a foam forming step.

Joining Step

In the joining step, the dynamic damper 4 is produced and attached to the stay 2. That is, the damper assembly A is produced. First, as shown in FIG. 3, the stay 2, the front-side elastic body 7F, the weight 80, and the back-side elastic body 7R are placed between the front-side divided body 6F and the back-side divided body 6R.

Next, as shown in FIG. 4, front-side engaging portions 62F are engaged with the back-side engaged portions 63R. That is, the front-side engaging portions 62F are inserted into the back-side engaged portions 63R. At this time, a pair of guided portions 621 of each front-side engaging portion 62F are guided by the inner surface of a corresponding one of the back-side engaged portions 63R. As shown in FIG. 7, a barb 620a of a pawl 620 of each front-side engaging portion 62F is stopped by the edge of the engaged opening 630. Similarly, the back-side engaging portions 62R are engaged with front-side engaged portions 63F. The front-side divided body 6F and the back-side divided body 6R are thus joined together by fitting of the pawls 620.

As shown in FIG. 5, the elastic member 7 having the weight 80 embedded therein is sandwiched between the front-side edge 610F and the back-side edge 610R from both sides in the front-rear direction when the front-side divided body 6F and the back-side divided body 6R are joined together. That is, the elastic member 7 is fixed along its entire perimeter by the edge 610.

As shown in FIG. 5, the stay 2 is sandwiched between the front-side attachment portion 60F and the back-side attachment portion 60R from both sides in the front-rear direction when the front-side divided body 6F and the back-side divided body 6R are joined together. That is, as shown in FIG. 6, the outer peripheral surface of the stay 2 is accommodated in the attachment recesses 600a of the attachment pieces 600 of the front-side attachment portion 60F and the attachment recesses 600a of the attachment pieces 600 of the back-side attachment portion 60R.

In this joining step, the dynamic damper 4 is thus produced by joining the front-side divided body 6F and the back-side divided body 6R together by fitting of the pawls 620. At the same time, the dynamic damper 4 is attached to the stay 2. That is, the damper assembly A is produced in this step.

First Insertion Step

As shown in FIG. 9A, the upholstery 30 has a pair of leg holes 300 and an assembly hole 301. The pair of leg holes 300 are formed side by side in the left-right direction. Each leg hole 300 has the shape of a perfect circle. The assembly hole 301 is formed next to the pair of leg holes 300. The assembly hole 301 has the shape of a long hole extending in the left-right direction. The dimensions are determined so as to satisfy $((\alpha+\beta)/\gamma)<1.3$, where $\alpha$ represents the length of the non-slit-corresponding portion A2 in the left-right direction, $\beta$ represents the length of the non-slit-corresponding portion A2 in the up-down direction, and $\gamma$ represents the length of the assembly hole 301 in the left-right direction.

In this step, as shown by an arrow Y1 (first insertion direction) in FIG. 9A, the pair of legs 20 are inserted into the pair of leg holes 300 via the assembly hole 301. As shown in FIG. 9B, the attachment member 6 is not accommodated in the upholstery 30. When the first insertion step is finished, the portions (pair of inter-hole portions D1) between the assembly hole 301 and the pair of leg holes 300 in the upholstery 30 are located in the upper ends of the slit portions C1. The non-slit-corresponding portion A2 therefore sticks out upward from the pair of leg holes 300 when the first insertion step is finished.

Second Insertion Step

In this step, as shown by arrows Y2 in FIG. 9B, a part of the upholstery 30, which is located near the edge of the assembly hole 301 of the upholstery 30 (specifically, a part located on the side (upper side) on which the pair of leg holes 300 are not formed), is first lifted to cover the non-slit-corresponding portion A2 with the upholstery 30. Next, as shown by an arrow Y3 (second insertion direction) in FIG. 9C, the pair of legs 20 are inserted back into the upholstery 30 by a predetermined length via the pair of leg holes 300. At this time, the slit-corresponding portion A1 is also inserted into the upholstery 30. The damper assembly A is thus set to a prescribed position in the upholstery 30.

Foam Forming Step

In this step, a raw material (including a polyisocyanate component, a polyol component, etc.) of the cushion member 31 is injected into the upholstery 30 via the assembly hole 301. The raw material foams in the upholstery 30, whereby the cushion member 31 is formed. The impregnated layers 70 shown in FIGS. 6 to 8 are formed as the front-side elastic body 7F and the back-side elastic body 7R are impregnated with the raw material.

Functions and Effects

Functions and effects of the headrest, the seat, and the manufacturing method of the headrest according to the present embodiment will be described. As shown in FIG. 3, in the joining step, the elastic member 7 is sandwiched between the front-side divided body 6F and the back-side divided body 6R from both sides in the front-rear direction. The elastic member 7 is thus fixed by the edge 610. This makes it easy to produce the dynamic damper 4 and to position the weight 80 with respect to the elastic member 7.

In the joining step, the elastic member 7 is fixed in an endless annular shape along its entire perimeter by the edge 610 (the front-side edge 610F and the back-side edge 610R). This can restrict excessive displacement of the weight 80 at the time of damping vibrations of the seat 9.

As shown in FIG. 8, the opening 61 extends through the attachment member 6 in the front-rear direction. That is, the opening 61 is not closed by the attachment member 6 on either side in the front-rear direction. Displacement of the weight 80 in the front-rear direction at the time of damping vibrations of the seat 9 is therefore less likely to be restricted as compared to the case where the opening 61 is closed by the attachment member 6. The edge 610 fixes the elastic member 7 in the up-down and left-right directions. The weight 80 therefore tends to be preferentially displaced in the front-rear direction with respect to the edge 610.

As shown in FIG. 3, in the joining step, not only the elastic member 7 but also the stay 2 are sandwiched between the front-side divided body 6F and the back-side divided body 6R from both sides in the front-rear direction, whereby the elastic member 7 is fixed to the edge 610 and the attachment portion 60 is attached to the stay 2. Production of the dynamic damper 4 and attachment of the dynamic damper 4 to the stay 2 can therefore be performed in parallel.

As shown in FIG. 1, the front-back direction of the attachment member 6 coincides with the front-rear direction of the vehicle. Vibrations of the seat 9 in the front-rear direction can therefore be preferentially restrained at the time of damping vibrations of the seat 9.

As shown in FIG. 8, in the joining step, the weight 80 is sandwiched between the front-side elastic body 7F and the back-side elastic body 7R from both sides in the front-rear direction. The weight 80 is therefore placed along the boundary plane f between the front-side elastic body 7F and the back-side elastic body 7R. The pair of right and left clearances B1 are defined between the weight 80 and the front-side elastic body 7F and the back-side elastic body 7R along the boundary plane f. The weight 80 therefore tends to be displaced in the left-right direction in addition to the front-rear direction.

As shown in FIGS. 1 and 8, in the foam forming step, the front surface of the front-side elastic body 7F and the rear surface of the back-side elastic body 7R are impregnated with a liquid raw material of the cushion member 31 when the raw material is injected into the upholstery 30. The pair of impregnated layers 70 can thus be formed at both front and rear surfaces of the elastic member 7. This can restrict excessive displacement of the weight 80 at the time of damping vibrations of the seat 9. The pair of impregnated layers 70, namely a restricting portion, can be placed at the same time the cushion member 31 is formed by foaming of the raw material.

Figure 10:
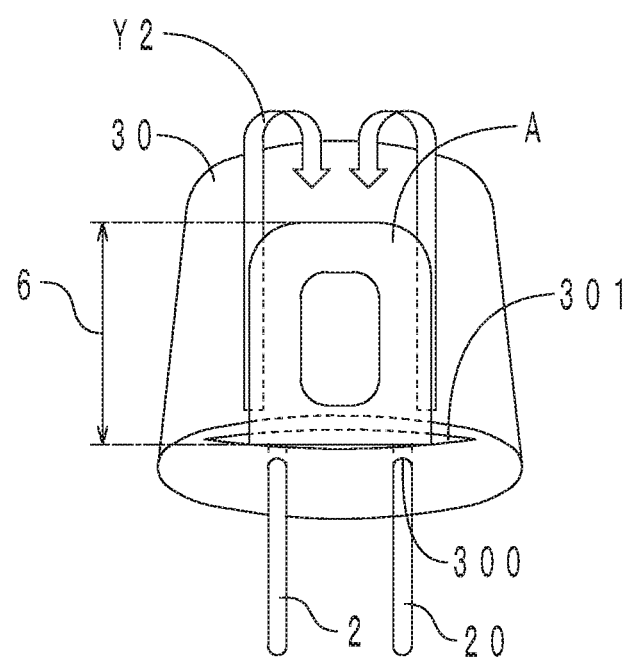
FIG. 10 is a schematic view illustrating a second insertion step of a manufacturing method of a headrest having no slit portion.

It is herein assumed that the attachment portion 60 of the attachment member 6 extends to the lower end of the attachment member 6, namely the pair of slit portions C1 shown in FIG. 5 are not provided. FIG. 10 is a schematic view of a second insertion step in a manufacturing method of a headrest having no slit portion. FIG. 10 corresponds to FIG. 9B. In FIG. 10, the portions corresponding to those in FIG. 9B are denoted by the same reference characters.

As shown in FIG. 10, in this case, the entire attachment member 6 (corresponding to the slit-corresponding portion A1 and the non-slit-corresponding portion A2 in FIG. 9B) sticks out upward from the pair of leg holes 300 when the first insertion step is finished. Accordingly, as shown by arrows Y2, the entire attachment member 6 need be accommodated in the upholstery 30 via the assembly hole 301 in the second insertion step. Specifically, the part of the upholstery 30 which is located near the edge of the assembly hole 301 need be lifted to cover the entire attachment member 6 with the upholstery 30. However, the assembly hole 301 needs to have a larger opening area in order to cover the entire attachment member 6 with the upholstery 30. For example, it is necessary to "form slits that connect the assembly hole 301 to the pair of leg holes 300" etc. in order to increase the opening area of the assembly hole 301.

As shown in FIG. 5, the pair of slit portions C1 opening downward are formed between the attachment member 6 and the pair of legs 20 of the damper assembly A of the present embodiment, As shown in FIG. 9B, when the first insertion step is finished, the pair of inter-hole portions D1 are located in the upper ends of the slit portions C1. Only the non-slit-corresponding portion A2 rather than the entire attachment member 6 therefore sticks out upward from the pair of leg holes 300 when the first insertion step is finished.

Providing the pair of slit portions C1 can thus reduce the size of the part that sticks out upward from the pair of leg holes 300 when the first insertion step is finished. The non-slit-corresponding portion A2 can therefore be accommodated in the upholstery 30 by merely lifting the part of the upholstery 30, which is located near the edge of the assembly hole 301, and covering the non-slit-corresponding portion A2 with the upholstery 30 in the second insertion step as shown by the arrows Y2 in FIG. 9B.

As shown in FIG. 9A, the dimensions are determined so as to satisfy $((\alpha+\beta)/\gamma)<1.3$, where $\alpha$ represents the length of the non-slit-corresponding portion A2 in the left-right direction, $\beta$ represents the length of the non-slit-corresponding portion A2 in the up-down direction, and $\gamma$ represents the length of the assembly hole 301 in the left-right direction. The opening area of the assembly hole 301 for the non-slit-corresponding portion A1 can thus be increased. Accordingly, the operation shown by the arrows Y2 in FIG. 9B (operation of lifting the part of the upholstery 30, which is located near the edge of the assembly hole 301, to cover the non-slit-corresponding portion A2 with the upholstery 30) can therefore be easily performed in the second insertion step.

As shown in FIG. 4, in the joining step, the front-side engaging portions 62F are engaged with the back-side engaged portions 63R, and the back-side engaging portions 62R are engaged with the front-side engaged portions 63F. That is, the front-side divided body 6F and the back-side divided body 6R are thus joined together by fitting of the pawls 620. Production of the dynamic damper 4 and attachment of the dynamic damper 4 to the stay 2 can therefore be performed in a single step.

As shown in FIG. 7, when the front-side engaging portions 62F are inserted into the back-side engaged portions 63R in the joining step, the pair of guided portions 621 of each front-side engaging portion 62F are guided by the inner surface of corresponding one of the back-side engaged portions 63R. This makes it easy to align the front-side engaging portions 62F with the back-side engaged portions 63R. Similarly, when the back-side engaging portions 62R are inserted into the front-side engaged portions 63F, the pair of guided portions 621 of each back-side engaging portion 62R are guided by the inner surface of corresponding one of the front-side engaged portions 63F. This makes it easy to align the back-side engaging portions 62R with the front-side engaged portions 63F.

As shown in FIG. 3, the configuration of the front-side divided body 6F is the same as that the back-side divided body 6R. The same divided body can therefore be used either as the front-side divided body 6F or the back-side divided body 6R. That is, divided bodies having different configurations need not be used as the front-side divided body 6F and the back-side divided body 6R.

The elastic member 7 of the dynamic damper 4 is more flexible than the cushion member 31 of the headrest body 3. The elastic member 7 is therefore less likely to restrict displacement of the weight 80, but the cushion member 31 tends to restrict excessive displacement of the weight 80.

As shown in FIG. 5, the damper assembly A of the present embodiment has the pair of slit portions C1. This allows the slit-corresponding portion A1 to extend in a different direction from that in which the legs 20 extend, as viewed from the left or right side. The dynamic damper 4 can therefore be embedded at a desired position in the headrest 92.

As shown in FIG. 7, the elastic member 7 is elastically compressed from both sides in the front-rear direction by the front-side edge 610F and the back-side edge 610R. The elastic member 7 therefore biases a part of the attachment member 6, which is located near the edge 610, outward in the front-rear direction. The barbs 620a of the front-side engaging portions 62F can therefore be firmly stopped by the edges of the engaged openings 630 of the back-side engaged portions 63R. Similarly, the barbs 620a of the back-side engaging portions 62R can be firmly stopped by the edges of the engaged openings 630 of the front-side engaged portions 63F. Since the columnar weight 80 is inexpensive, the production cost of the dynamic damper 4 can be reduced.

The attachment member 6 is a rigid body made of resin. The dynamic damper 4 can therefore be firmly attached to the stay 2 by merely placing the attachment portion 60 so as to correspond to the upper ends of the pair of legs 20 and the connecting portion 21. The pair of slit portions C1 are therefore easily secured as shown in FIG. 5.

Second Embodiment

Figure 11:
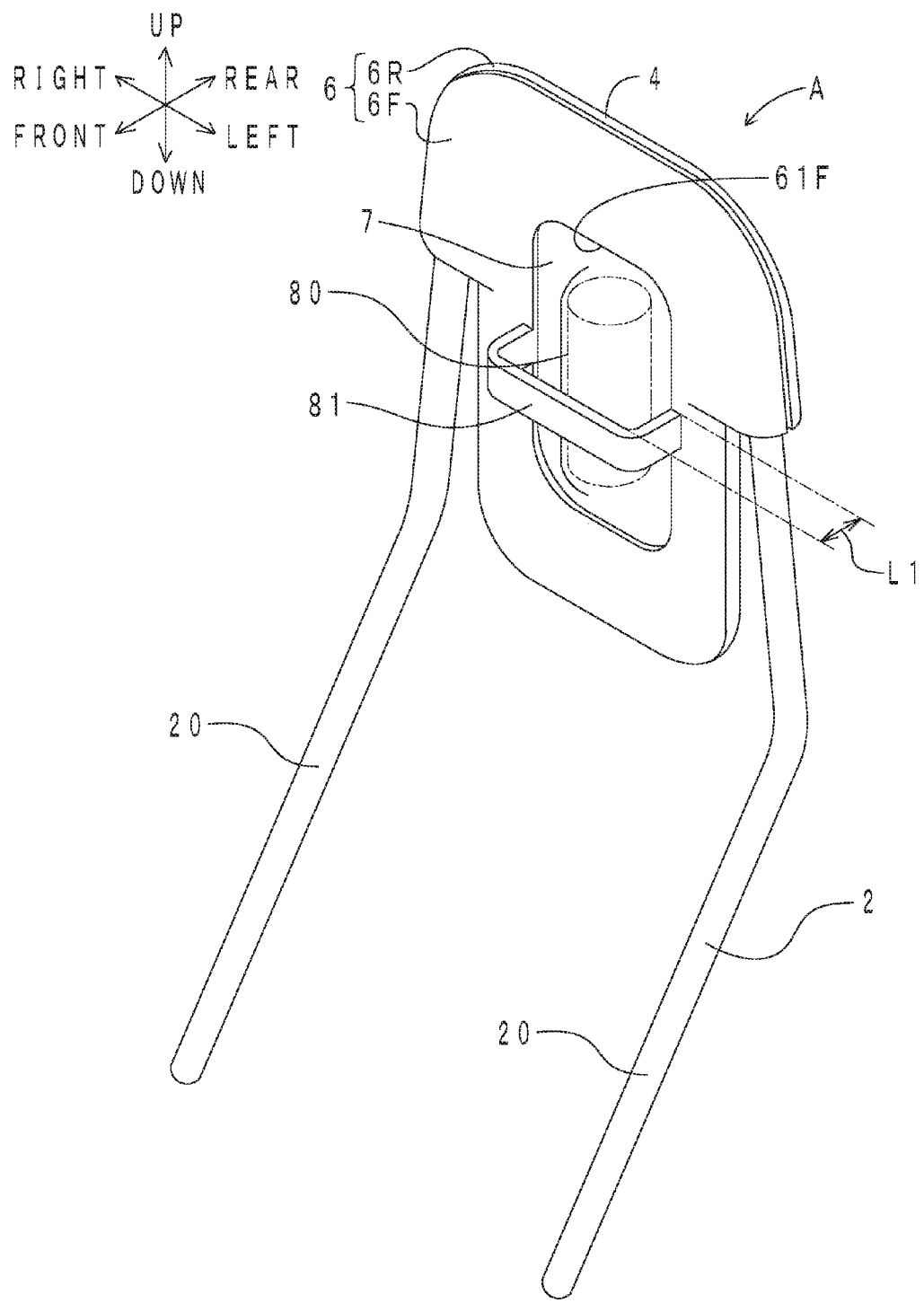
FIG. 11 is a perspective view of a damper assembly of a headrest according to a second embodiment.

A second embodiment is different from the first embodiment in that the dynamic damper has connecting members. Only the difference between the first and second embodiments will be described below. FIG. 11 is a perspective view of a damper assembly of a headrest according to the present embodiment. In FIG. 11, the portions corresponding to those in FIG. 2 are denoted by the same reference characters.

As shown in FIG. 11, the front-side divided body 6F of the dynamic damper 4 has a connecting member 81 that extends across the front-side opening 61F. The connecting member 81 has the shape of a belt and is located on the front side of the front-side opening 61F. The connecting member 81 extends in the left-right direction across the middle part of the front-side opening 61F in the up-down direction (the part of the front-side opening 61F which overlaps the weight 80 as viewed from the front). A similar connecting member 81 is provided on the rear side of the back-side opening of the back-side divided body 6R.

The headrest of the second embodiment has functions and effects similar to those of the first embodiment regarding those portions having the same configuration as that of the first embodiment. The pair of connecting members 81 are provided on both sides of the opening of the attachment member 6 in the front-rear direction. This can restrain excessive displacement of the weight 80 at the time of damping vibrations of the seat 9. The length to which displacement of the weight 80 is restricted can be easily controlled by adjusting the leg length L1 of the connecting members 81 (specifically, in the case of the front-side connecting member 81, the length in the front-rear direction from the front surface of the front-side divided body 6F to the rear surface of the body of the connecting member 81).

Third Embodiment

Figure 12:
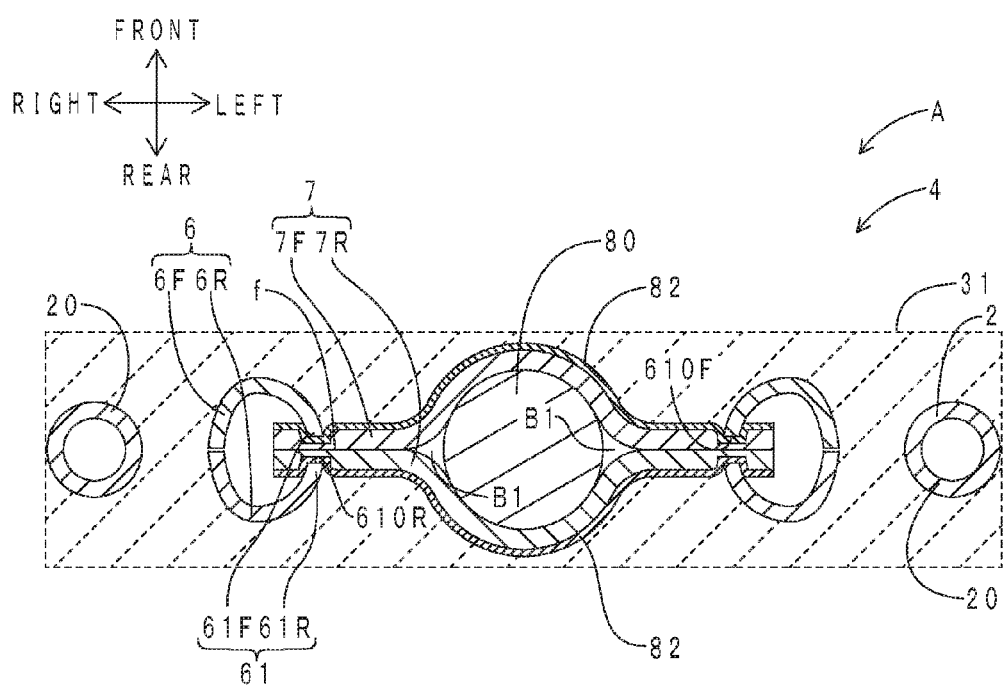
FIG. 12 is a sectional view of a damper assembly of a headrest according to a third embodiment taken along the front-rear direction.

A third embodiment is different from the first embodiment in that the dynamic damper has a pair of film members. Only the difference between the first and third embodiments will be described below. FIG. 12 is a sectional view of a damper assembly of a headrest according to the present embodiment taken along the front-rear direction. In FIG. 12, the portions corresponding to those in FIG. 8 are denoted by the same reference characters.

As shown in FIG. 12, a pair of film members 82 are provided on both sides of the elastic member 7 in the front-rear direction. The film members 82 are made of resin. The front-side film member 82 covers the entire front surface of the front-side elastic body 7F. The rear-side film member 82 covers the entire rear surface of the back-side elastic body 7R.

The headrest of the present embodiment has functions and effects similar to those of the headrest of the first embodiment regarding those portions having the same configuration as that of the first embodiment. The pair of film members 82 are provided on both sides of the elastic member 7 in the front-rear direction. This can restrain excessive displacement of the weight 80 at the time of damping vibrations of the seat 9. The length to which displacement of the weight 80 is restricted can be easily controlled by adjusting the allowance for slacking of the film members 82 (the length of a clearance between the elastic member 7 and the film member 82 in the front-rear direction). The film members 82 can restrain the front-side elastic body 7F and the back-side elastic body 7R from being impregnated with the liquid raw material of the cushion member 31.

Fourth Embodiment

Figure 13:
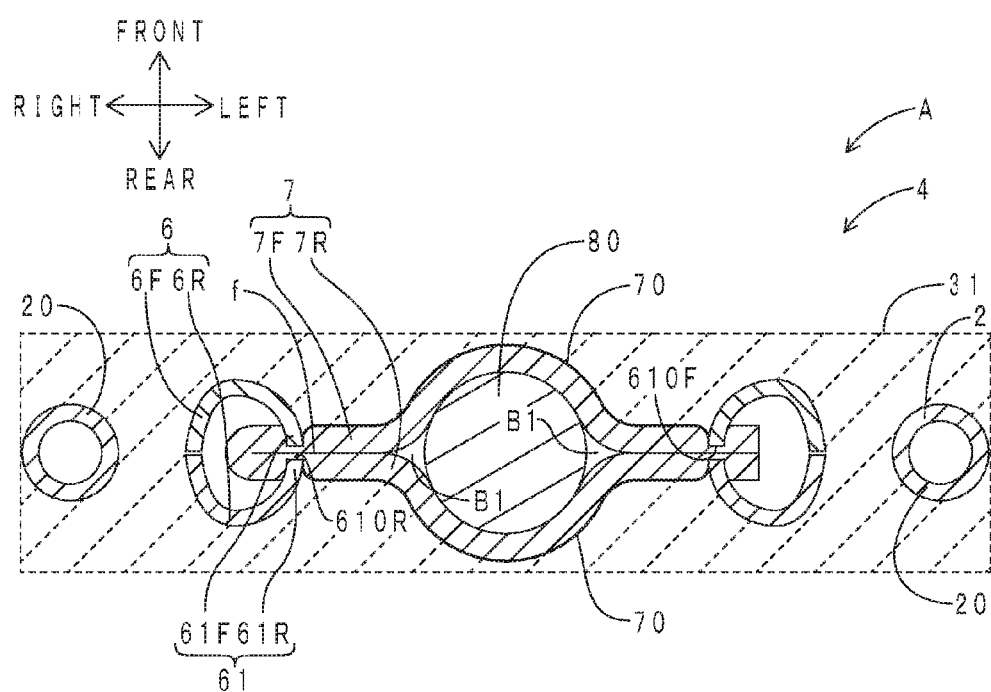
FIG. 13 is a sectional view of a damper assembly of a headrest according to a fourth embodiment taken along the front-rear direction.

A fourth embodiment is different from the first embodiment in that the front-side elastic body and the back-side elastic body are formed as a single-piece member. Only the difference between the first and fourth embodiments will be described below. FIG. 13 is a sectional view of a damper assembly of a headrest according to the present embodiment taken along the front-rear direction. In FIG. 13, the portions corresponding to those in FIG. 8 are denoted by the same reference characters. As shown in FIG. 13, the front-side elastic body 7F and the back-side elastic body 7R are formed by folding a single elastic body. That is, the elastic member 7 is a single-piece member.

The headrest of the present embodiment has functions and effects similar to those of the headrest of the first embodiment regarding those portions having the same configuration as that of the first embodiment. Since the elastic member 7 is a single-piece member, the number of parts of the dynamic damper 4 is reduced.

Others

The embodiments of the headrest, the seat, and the manufacturing method of the headrest according to the present invention are described above. However, embodiments of the present invention are not particularly limited to those described above. The present invention can be carried out in various modified or improved forms known to those skilled in the art.

In the above embodiments, as shown in FIG. 4, the dynamic damper 4 is produced by joining the front-side divided body 6F and the back-side divided body 6R by fitting of the pawls 620 in the joining step. However, a method for joining the front-side divided body 6F and the back-side divided body 6R is not particularly limited. For example, the front-side divided body 6F and the back-side divided body 6R may be joined together by clips, screws, adhesive, adhesive tape, welding, etc.

The front-side divided body 6F and the back-side divided body 6R shown in FIG. 3 need not be completely separate bodies. For example, the front-side divided body 6F and the back-side divided body 6R may be connected by using a flexible hinge etc. The front-side divided body 6F and the back-side divided body 6R need not necessarily have the same shape and may have different shapes.

The direction in which the weight 80 extends as shown in FIG. 3 is not particularly limited. For example, the weight 80 may extend in the left-right direction. The shape of the weight 80 is not particularly limited. For example, the weight 80 may have the shape of a sphere, a prism, etc.

The direction in which the opening 61 extends through the attachment member 6 as shown in FIG. 5, namely the front-back direction of the attachment member 6, may be the left-right direction. The weight 80 thus tends to be preferentially displaced in the left-right direction. In case of excessive vibrations of the seat 9 in the front-rear direction, the attachment portion 60 of the attachment member 6 (the edge 610 of the opening 61) can serve as a restricting portion to restrict excessive displacement of the weight 80 in the front-rear direction. The film members 82 shown in FIG. 12 may be bonded to the elastic member 7 in advance.

The materials of the attachment member 6, the weight 80, the elastic member 7, the connecting members 81, and the film members 82 are not particularly limited. For example, the attachment member 6 and the connecting members 81 may be made of resin or metal, the film members 82 may be made of resin, the weight 80 may be made of metal or resin, and the elastic member 7 may be made of resin foam. The configuration of the attachment portion 60 is not particularly limited. Instead of the plurality of attachment pieces 600, the attachment portion 60 may have a continuous recess having a C-shape so as to correspond to the upper ends of the pair of legs 20 and the connecting portion 21 of the stay 2.

The pair of connecting members 81 shown in FIG. 11 need not necessarily have the shape of a belt. For example, the front-side connecting member 81 may have the shape of a lid curved toward the front side. The front-side connecting member 81 may cover the entire front-side opening 61F from its front side. Similarly, the rear-side (back-side) connecting member 81 may have the shape of a lid curved toward the rear (back side). The rear-side connecting member 81 may cover the entire back-side opening 61R from its rear side. A predetermined clearance can therefore be secured in the front-rear direction between the opening (the front-side opening 61F and the back-side opening 61R) and the pair of lid-shaped connecting members 81. The weight 80 therefore tends to be displaced in the front-rear direction. In case the weight 80 is excessively displaced, displacement of the weight 80 can be restricted by the pair of lid-shaped connecting members 81.

What is claimed is:

1. A headrest for a vehicle, comprising:
a stay;
a headrest body supported by the stay; and
a dynamic damper attached to the stay and embedded in the headrest body, wherein the dynamic damper includes: an attachment member having an attachment portion attached to the stay and an opening extending through the attachment member in a front-back direction of the headrest; an elastic member that is placed in the opening and that is fixed along an entire perimeter of the elastic member by an edge of the opening; and a weight embedded in the elastic member and placed in the opening, the attachment member includes a front-side divided body and a back-side divided body placed on a back side of the front-side divided body, the front-side divided body having inner and outer peripheral edges and the back-side divided body having inner and outer peripheral edges, wherein the front-side divided body and the back-side divided body are connected together such that the inner peripheral edges of the front-side divided body and back-side divided body protrude in the front-back direction toward each other and the outer peripheral edges of the front-side divided body and back-side divided body protrude in the front-back direction toward each other to define a closed loop space therebetween, wherein the inner peripheral edges of the front-side divided body and back-side divided body define the edge of the opening, the elastic member is sandwiched between the inner peripheral edge of the front-side divided body and the inner peripheral edge of the back-side divided body from both sides in the front-back direction of the headrest such that the edge of the opening fixes the entire perimeter of the elastic member via depression of surfaces on both sides of the elastic member, and wherein the depression of the surfaces on both sides of the elastic member defines a closed loop shape that is retained within the closed loop space of the front-side divided body and the back-side divided body.

2. The headrest according to claim 1, wherein
the front-back direction of the headrest is arranged along a front-rear direction or a left-right direction of the vehicle.

3. The headrest according to claim 1, wherein
the elastic member includes a front-side elastic body and a back-side elastic body placed on a back side of the front-side elastic body,
the weight is sandwiched between the front-side elastic body and the back-side elastic body from both sides in the front-back direction of the headrest, so that the weight is placed along a boundary plane between the front-side elastic body and the back-side elastic body, and
a clearance is defined between the weight and the front-side and back-side elastic bodies along the boundary plane.

4. The headrest according to claim 3, wherein
the elastic member having the weight embedded therein and the stay are sandwiched between the front-side divided body and the back-side divided body from both sides in the front-back direction of the headrest, so that the elastic member is fixed along the entire perimeter by the edge of the opening and the attachment portion is attached to the stay.

5. The headrest according to claim 4, wherein
the stay includes a pair of legs extending in an up-down direction and a connecting portion connecting upper ends of the pair of legs,
the attachment member is interposed between the pair of legs, and
a pair of slit portions opening downward are defined between the attachment member and the pair of legs.

6. The headrest according to claim 1, further comprising:
a restricting portion that restricts displacement of the weight in the front-back direction of the headrest.

7. The headrest according to claim 6, wherein
the restricting portion is a pair of connecting members that are placed on the attachment member on both sides of the opening in the front-back direction of the headrest so as to extend across the opening.

8. The headrest according to claim 6, wherein
the restricting portion is a pair of film members that cover the elastic member from both sides in the front-back direction of the headrest.

9. The headrest according to claim 6, wherein
the headrest body includes a cushion member made of resin foam, and
the restricting portion is a pair of impregnated layers formed by impregnating front and back surfaces of the elastic member with a raw material of the cushion member.

10. A seat comprising the headrest according to claim 1.

11. The headrest according to claim 1,
wherein an outer periphery of the front-side divided body and an outer periphery of the back-side divided body together extending beyond the perimeter of the elastic body, with respect to left-right and up-down directions of the vehicle, so as to surround the perimeter of the elastic body in a spaced-apart relationship.

12. The headrest according to claim 1, wherein the closed loop shape of the depression is coplanar with the closed loop space, and wherein a perimeter of the closed loop shape is smaller than a perimeter of the closed loop space.

* * * * *